United States Patent
Lopez

(10) Patent No.: US 10,533,594 B2
(45) Date of Patent: Jan. 14, 2020

(54) TEMPORARY FASTENER WITH LATERAL FLOAT RANGE

(71) Applicant: Zephyr Manufacturing Co., Inc., Inglewood, CA (US)

(72) Inventor: Paulo Cesar Pajuelo Lopez, Inglewood, CA (US)

(73) Assignee: Zephyr Manufacturing Co., Inc., Inglewood, CA (US)

( * ) Notice: Subject to any disclaimer, the term of this patent is extended or adjusted under 35 U.S.C. 154(b) by 55 days.

(21) Appl. No.: 15/647,119

(22) Filed: Jul. 11, 2017

(65) Prior Publication Data

US 2018/0017094 A1 Jan. 18, 2018

Related U.S. Application Data

(60) Provisional application No. 62/410,805, filed on Oct. 20, 2016, provisional application No. 62/361,349, filed on Jul. 12, 2016.

(51) Int. Cl.
*F16B 19/10* (2006.01)
*F16B 5/02* (2006.01)

(52) U.S. Cl.
CPC .......... *F16B 19/109* (2013.01); *F16B 5/0258* (2013.01)

(58) Field of Classification Search
CPC ..... F16B 19/109; F16B 5/0225; F16B 5/0628
USPC .......................................... 411/347, 348, 383
See application file for complete search history.

(56) References Cited

U.S. PATENT DOCUMENTS

| 3,883,129 A * | 5/1975 | Jones ..................... F16B 19/109 269/49 |
| 4,537,542 A * | 8/1985 | Pratt ..................... B25B 31/005 24/607 |
| 4,548,533 A * | 10/1985 | Pratt ..................... F16B 19/109 24/607 |
| 4,725,162 A * | 2/1988 | Haller ..................... B25B 9/00 165/11.2 |
| 5,240,361 A * | 8/1993 | Armstrong ............ F16B 19/109 269/48.2 |
| 8,448,929 B2 * | 5/2013 | Prot ..................... B23B 49/026 269/49 |
| 10,001,156 B2 * | 6/2018 | McClure ............... F16B 5/0225 |
| 2017/0307002 A1 * | 10/2017 | McClure ............... F16B 19/109 |

* cited by examiner

*Primary Examiner* — Flemming Saether
(74) *Attorney, Agent, or Firm* — Knobbe, Martens, Olson & Bear, LLP

(57) ABSTRACT

A temporary fastening device comprises a collet and mandrel connected to a temporary fastener body. The device comprises a first float cap, a second float cap, a third float cap, and a temporary fastener body which may be axially connected. The lateral clearance between the collet and a first aperture defines a first radially extending float region. The lateral clearance between the second float cap and the first float cap define a second radially extending float region. The collet and temporary fastener body may radially translate within the first and second radially extending float regions.

15 Claims, 5 Drawing Sheets

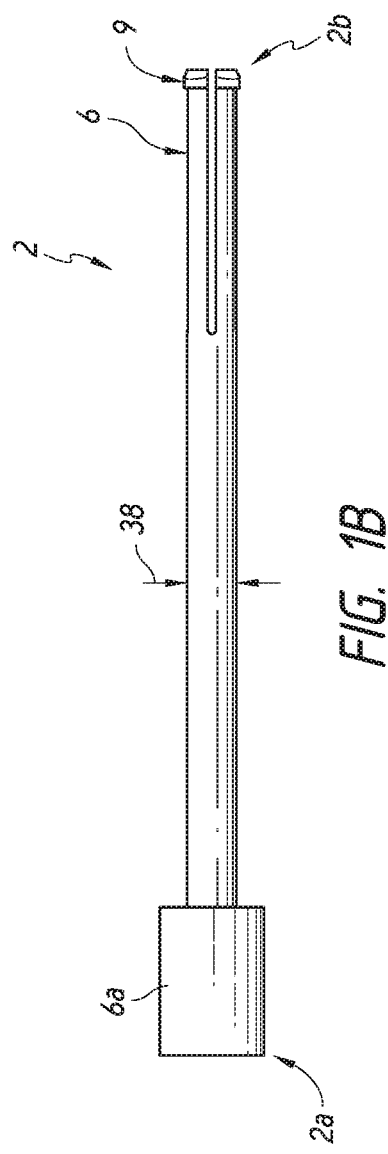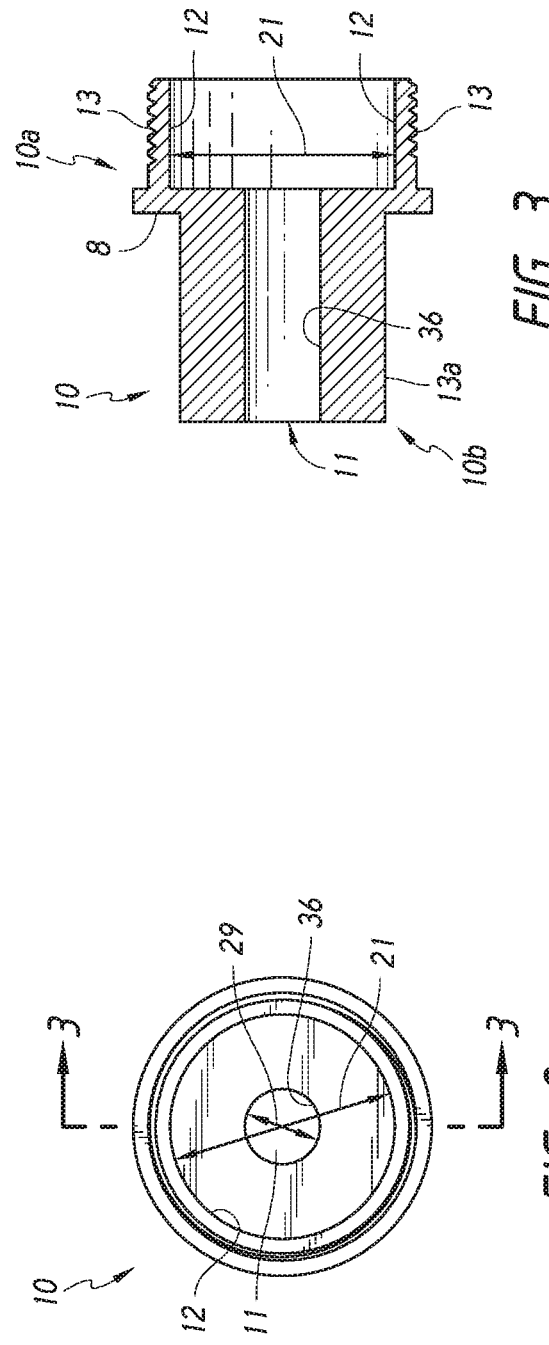

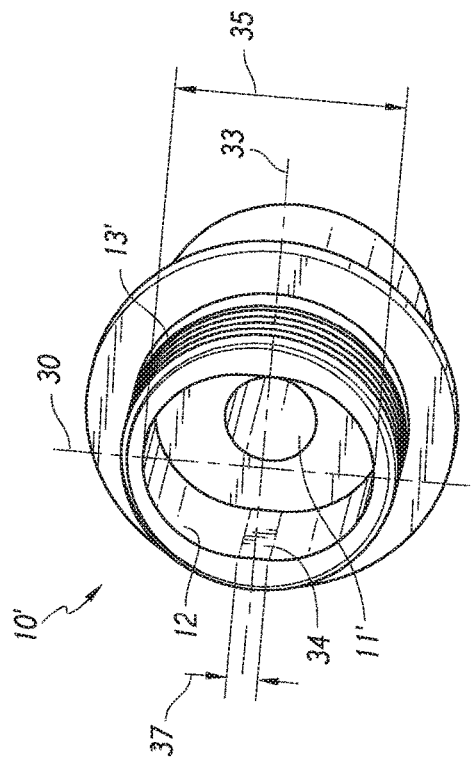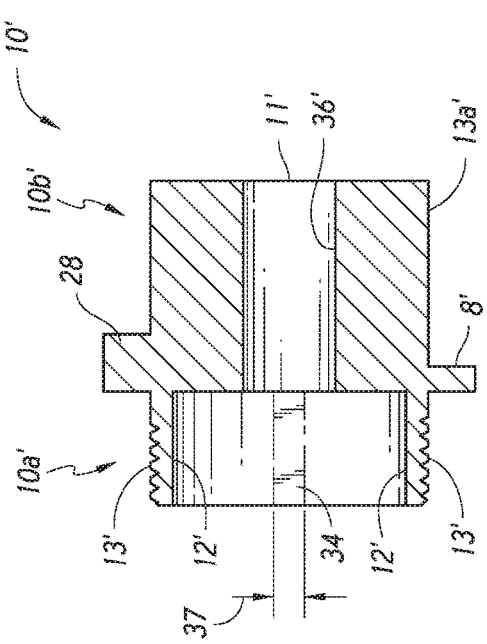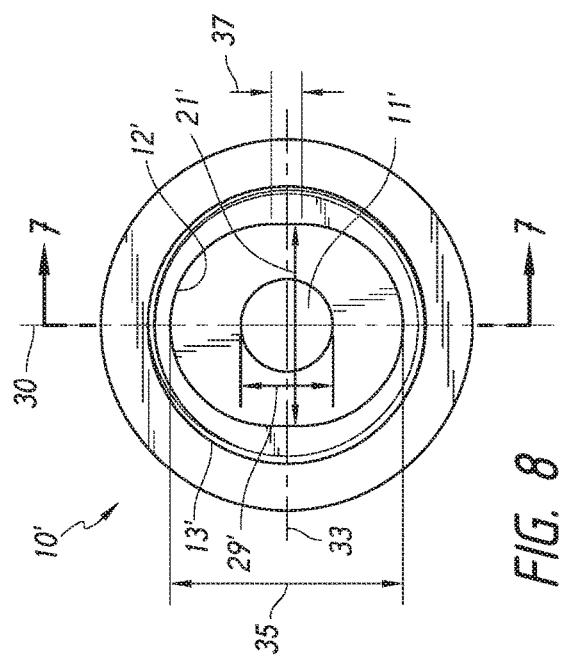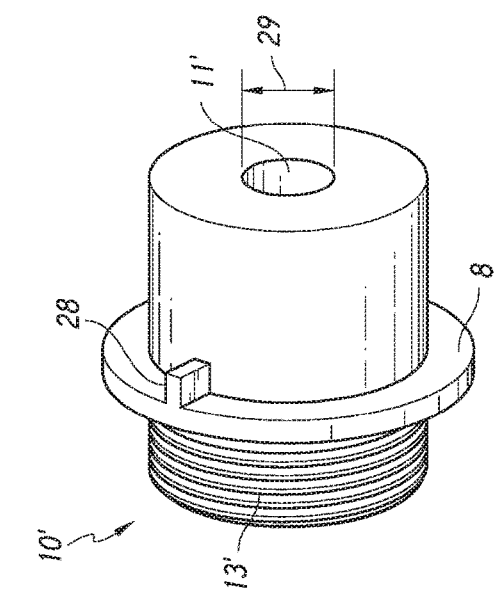

TEMPORARY FASTENER WITH LATERAL FLOAT RANGE

CROSS REFERENCE TO RELATED APPLICATIONS

This application claims the benefit under 35 U.S.C. 119(e) to U.S. Provisional Application No. 62/410,805, filed Oct. 20, 2016, titled TEMPORARY FASTENER WITH LATERAL FLOAT RANGE and to U.S. Provisional Application No. 62/361,349, filed Jul. 12, 2016, titled TEMPORARY FASTENER WITH LATERAL FLOAT RANGE. The entire contents of the above-identified patent applications are incorporated by reference herein and made a part of this specification. Any and all applications for which a foreign or domestic priority claims is identified in the Application Data Sheet as filed with the present application are hereby incorporated by reference under 37 CFR 1.57.

BACKGROUND

Technical Field

The present disclosure generally relates to temporary fasteners. In particular, the present disclosure generally relates to temporary fasteners suitable for use with jig fixtures that subject the temporary fasteners to lateral loading.

Description of the Related Art

Temporary fasteners may be used in the manufacture of aircraft. For example, temporary fasteners may be used during the assembly of wings, fuselage, and aircraft skin substructure prior to drilling holes for permanent fasteners by automated drilling machines. The fasteners are temporarily inserted, the manufacture of the component is completed, and then the fasteners are removed.

SUMMARY

Certain example embodiments are summarized below for illustrative purposes. The embodiments are not limited to the specific implementations recited herein. Embodiments may include several novel features, no single one of which is solely responsible for its desirable attributes or which is essential to the embodiments.

In some instances, including those in which the temporary fasteners are used to temporarily secure components to a curved surface, the temporary fasteners can receive significant lateral loading. The lateral loading can cause breakage or deformation of the temporary fasteners. Often, numerous temporary fasteners are used to secure components to a curved or other surface, and each temporary fastener is subjected to significant lateral loading. The inability of these conventional fasteners to withstand such lateral loading causes breakage or deformation of many fasteners. Replacement of temporary fasteners is time consuming and costly, and breakage or deformation of these fasteners impairs the construction process. A temporary fastener that can allow some degree of lateral float is desired to allow movement in response to the lateral loading while reducing or eliminating the breakage or deformation of the fastener.

Certain advantageous embodiments disclosed herein reduce or eliminate these and other problems associated with conventional temporary fasteners by allowing the temporary fasteners to move radially (e.g., perpendicular to the direction of the longitudinal axis of a collect) in response to the lateral loads imparted during the final assembly process. Some embodiments allow the temporary fastener to translate in any radial direction. In other embodiments, the temporary fastener may only translate in the single radial direction desired by the user of the temporary fastener.

In various embodiments, a temporary fastener can include a collet, at least one prong, a mandrel disposed within the collet, a first float cap, a second float cap, a third float cap, and a temporary fastener body. The first float cap may include a shoulder, a first outer surface, and a first inner surface. The first float cap can also include a first aperture through which the collet and mandrel extend, where the first aperture defines a first radially extending float region between the first aperture walls and the collet. Additionally, the second float cap can include a second outer surface and a second inner surface. The second float cap can also include a second aperture through which the collet and the mandrel extend. The second float cap may include a connection to the temporary fastener body. Further, in some embodiments, the lateral space between the first inner surface of the first float cap and the second outer surface of the second float cap defines a second radially extending float region. The third float cap can include a third outer surface, a third inner surface, a connection to the first float cap, and a third aperture. The walls of the third aperture may be radially spaced from an outer surface of the temporary fastener body. In some embodiments, the second float cap is confined within the second radially extending float region. The collet, the first float cap, the second float cap, the third float cap, and the temporary fastener body can be axially connected. The collet, the second float cap, and the temporary fastener body may translate radially within the first radially extending float region and the second radially extending float region.

BRIEF DESCRIPTION OF THE DRAWINGS

Throughout the drawings, reference numbers can be reused to indicate general correspondence between reference elements. The drawings are provided for illustrative purposes only, and the embodiments are not limited to the specific implementations illustrated in the drawings.

FIG. 1B is an external view of a portion of the collet feature of FIG. 1A.

FIG. 2 is an end view of a first float cap, which is identified by the numeral 10 in FIG. 1A.

FIG. 3 is a cross-sectional view of the first float cap of FIG. 2.

FIG. 8 is an end view of a first float cap comprising an inner surface of generally oval cross-section.

FIG. 9 is a perspective view of a first float cap comprising an inner surface of generally oval cross-section.

FIG. 10 is a perspective view of a directional translation indicator of the first float cap of FIGS. 8 and 9.

FIG. 11 is a cross-sectional view of the first float cap of FIG. 8 and the directional translation indicator of FIG. 10.

DETAILED DESCRIPTION

Figure 1A:
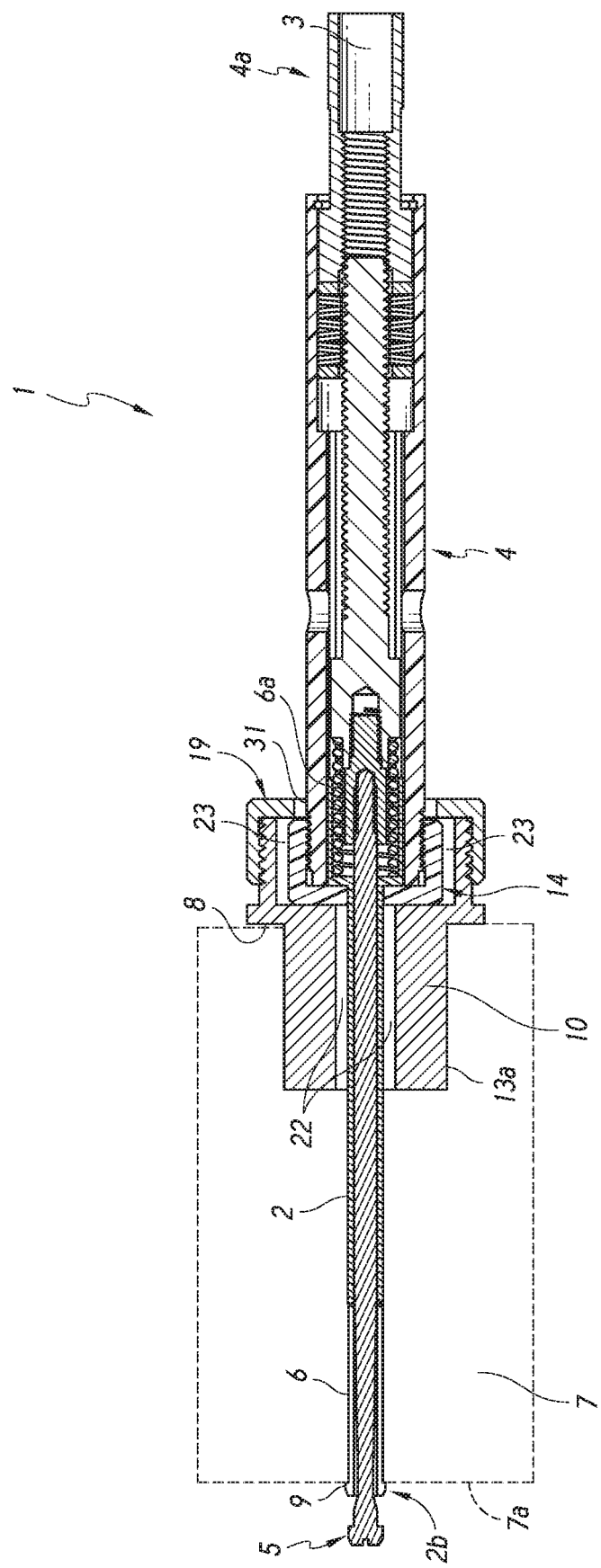
FIG. 1A is a cross-sectional view of a temporary fastener that is arranged and configured in accordance with certain features, aspects, and advantages of an embodiment of the present disclosure.

FIG. 1A illustrates a temporary fastener 1 that is arranged and configured in accordance with certain features, aspects, and advantages of an embodiment of the present disclosure. As is illustrated in FIG. 1A, the temporary fastener 1 comprises a number of components that are secured together with axial connections while still allowing for radial translation of certain components.

A nut 3 is connected to a top end 4a of the temporary fastener body 4. The temporary fastener body 4 comprises a mechanism which allows adjustment of the nut 3 to cause a mandrel 5 (e.g., a head of the mandrel 5) to retract toward the top end 4a of the temporary fastener body 4 (e.g., toward the nut 3) Likewise, the temporary fastener body 4 comprises a mechanism which allows adjustment of the nut 3 to cause the mandrel 5 to extend away from the top end 4a of the temporary fastener body 4 (e.g., away from the nut 3). Further, the temporary fastener body 4 comprises an outer surface 31, as FIG. 1A illustrates.

As the nut 3 is tightened, the mandrel 5 retracts toward the top end 4a of the temporary fastener body 4. Eventually, sufficient tightening of the nut 3 causes the mandrel 5 to press against a bottom end 2b of the collet 2. The bottom end 2b of the collet 2 comprises at least one prong 6. Each prong can include a tip 9 at its end. When the nut 3 is tightened sufficiently to cause the mandrel 5 to retract into the collet 2, the collet 2 and mandrel 5 can press the at least one tip 9 of the at least one prong 6 against a bottom edge 7a of a material 7 (e.g., one or more layers of material) when the temporary fastener 1 is inserted through the material 7. Tightening the nut 3 causes the material 7 to become compressed between the at least one tip 9 of the at least one prong 6 and at least one shoulder 8 of a bottom portion 10b of the first float cap 10. By compressing the material 7 between the at least one shoulder 8 and at least one tip 9, the temporary fastener 1 temporarily secures material in place.

FIG. 1B illustrates bottom end portion 2b of collet 2. As illustrated, the tip 9 is a protrusion that can extend radially away from the collet 2 and the mandrel 5. The tip 9 can act as a gripping surface to hold the collet 2, prong 6, tip 9, and mandrel 5 to the bottom surface 7a of a material 7 (e.g. one or more layers of material) as illustrated in FIG. 1A. The bottom end 2b of the collet 2 may be divided as is illustrated in FIG. 1B into at least one prong 6. Dividing the bottom end 2b of the collet 2 can allow the at least one prong 6 to expand radially away from the mandrel 5 when the at least one prong 6 is not disposed within a material 7. Tightening the nut 3 can retract the collet 2, the at least one prong 6 of the collet 2, and the mandrel 5 toward the nut 3, until the tip 9 of the at least one prong 6 contacts the bottom edge 7a of a material 7 and the mandrel 5 contacts the bottom end 2b of the collet. A top end 2a of the collet 2 can include a head 6a having a diameter greater than the diameter of the bottom end 2b having the at least one prong 6. The head 6a of the top end 2a of the collet 2 can be disposed within the temporary fastener body 4 as is illustrated in FIG. 1A. Additionally, as is also illustrated in FIG. 1A, the head 6a of collet 2 can be of a greater diameter than a second aperture diameter 16 of a second aperture 15 of a second float cap 14.

FIG. 1A and FIGS. 2-3 each illustrate a first float cap 10. The first float cap 10 comprises a top portion 10a and a bottom portion 10b. The top portion 10a can have an outer diameter greater than the outer diameter of the bottom portion 10b. The first float cap 10 can include at least one shoulder 8. The shoulder 8 can be positioned within the bottom portion 10b at a transition between the top portion 10a and the bottom portion 10b of the first float cap 10. The first float cap 10 comprises a first aperture 11 which extends through the entirety of the first float cap 10. Additionally, the top portion 10a of the first float cap 10 comprises a first inner surface 12 and a first outer surface 13. In one embodiment, as illustrated in FIG. 2, the first inner surface 12 may be of circular cross-section. In another embodiment, as illustrated in FIGS. 8-9, the first inner surface 12 may be of oval or other non-circular cross-section. The bottom portion 10b of the first float cap 10 can also include a bottom external surface 13a.

The first aperture 11 may have a first aperture diameter 29 through at least part of the length of the bottom portion 10b of the first float cap 10, although the temporary fastener 1 can be made using a variety of different first aperture diameters as is needed to accommodate the selected collet 2 size. The first aperture 11 allows the collet 2 and mandrel 5 to extend through the first float cap 10 and second float cap 14 and ultimately allow for the collet 2 and mandrel 5 to be connected to the temporary fastener body 4. The lateral clearance between the collet 2 and the first aperture walls 36 of the first aperture 11 defines a first radially extending float region 22, as illustrated in FIG. 1A. The first float cap 10 can also include a first float cap inner diameter 21 in the top portion 10a of the first float cap 10.

FIG. 3 illustrates a cross-sectional view of the first float cap 10. The first outer surface 13 may be threaded for connection with a third float cap 19, although other types of connections are contemplated as part of the present disclosure.

Figure 5:
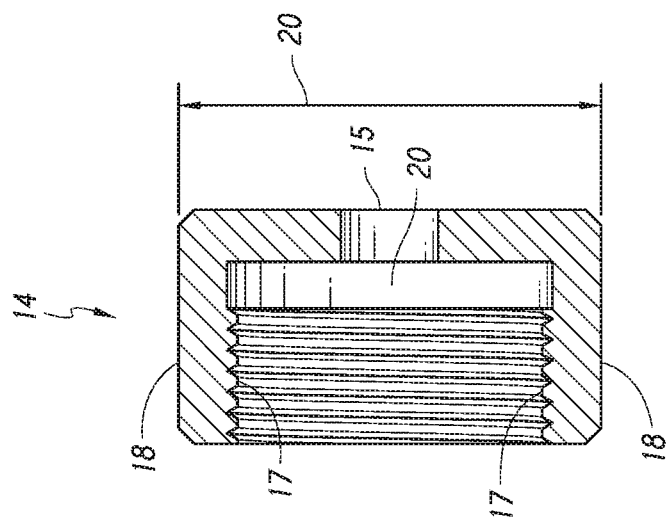
FIG. 5 is a cross-sectional view of the second float cap of FIG. 4.
Figure 4:
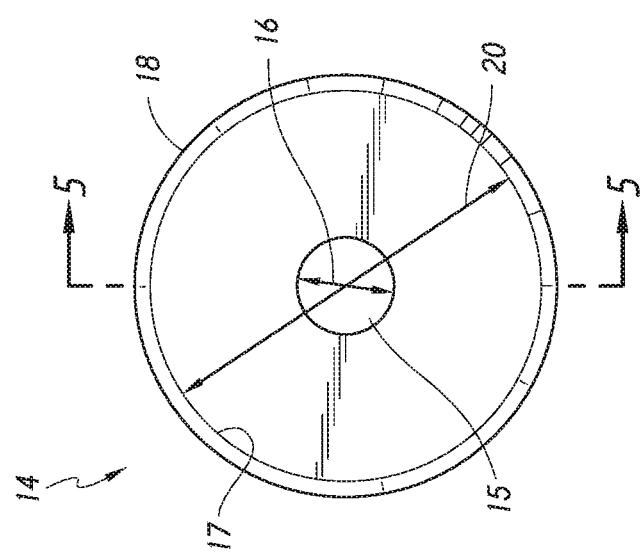
FIG. 4 is an end view of a second float cap, which is identified by the numeral 14 in FIG. 1A.

FIGS. 4-5 illustrate the second float cap 14. FIG. 4 shows an end view of the second float cap 14. The second float cap 14 includes a second aperture 15 with second aperture diameter 16. As with the first aperture diameter 29 of the first float cap 10, the temporary fastener 1 can be made using a variety of different second aperture diameters as is needed to accommodate the selected collet 2 size. The mandrel 5 and the collet 2 extend through the first aperture 11 of the first float cap 10, through the second aperture 15 of the second float cap 14, and connect with the temporary fastener body 4. The second float cap 14 comprises a second float cap outer diameter 20 which is less than the first float cap inner diameter 21. The second float cap 14 includes a second inner surface 17 and a second outer surface 18. The lateral clearance between the second outer surface 18 of the second float cap 14 and first inner surface 12 of the first float cap 10 defines a second radially extending float region 23, as illustrated in FIG. 1A, in which the second float cap can radially translate. It is noted for the purposes of the present disclosure that radial translation is defined as the lateral movement of temporary fastener components in a direction that is perpendicular to the longitudinal axis of the collet 2.

FIG. 5 illustrates a cross-sectional view of the second float cap 14. The second inner surface 17 may be threaded for connection with the temporary fastener body 4, although other types of connections are contemplated as part of the present disclosure. For example, the second float cap 14 and temporary fastener body 4 could be manufactured together as a single piece, or connected by welding or other connection techniques such as snap-fitting.

Figure 7:
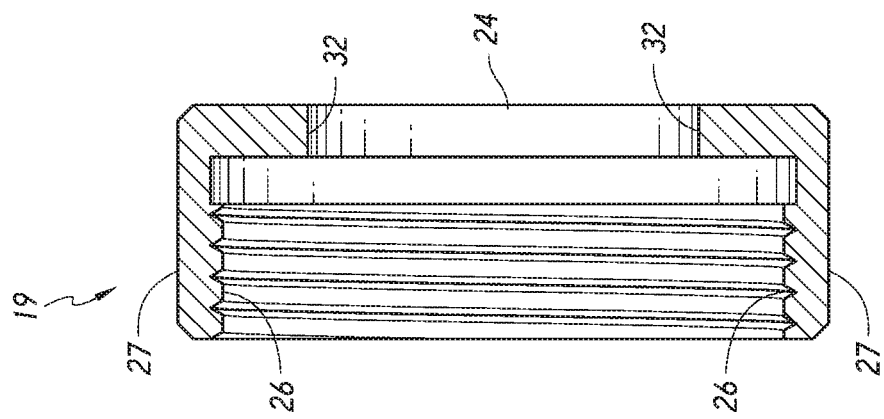
FIG. 7 is a cross-sectional view of the third float cap of FIG. 6.
Figure 6:
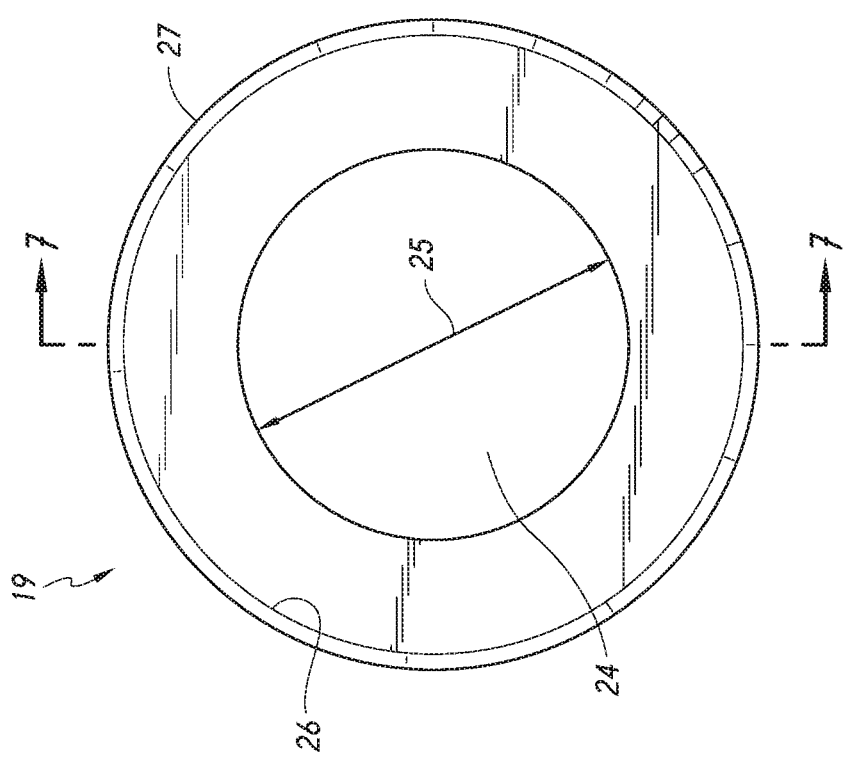
FIG. 6 is an end view of a third float cap, which is identified by the numeral 19 in FIG. 1A.

FIGS. 6-7 illustrate the third float cap 19. FIG. 4 shows an end view of the third float cap 19. The third float cap 19 includes a third aperture 24 with third aperture diameter 25. The third float cap 19 may include a third inner surface 26 and a third outer surface 27. The third inner surface 26 third float cap 19 can connect with the first outer surface 13 of the top portion 10a of the first float cap 10. The third aperture diameter 25 is sized such that the second float cap 14 is confined within the second radially extending float region 23. In this configuration, the second outer surface 18 of the second float cap 14 cannot pass through the third aperture 24. For example, the second float cap outer diameter 20 can be greater than the third aperture diameter 25 of the third aperture 24. Simultaneously, the third aperture diameter 25 may be large enough to ensure that the circumference of the third aperture 24 does not bind against the temporary fastener body 4. In some embodiments, the space between the walls 32 of the third aperture 24 and the outer surface 31 of the fastener body 4 permits lateral movement of the fastener body 4 with respect to the third float cap 19. The third float cap 19 can be made using a range of third aperture diameters as is necessary to accommodate the temporary fastener body 4.

FIG. 7 illustrates a cross-sectional view of the third float cap 19. The third inner surface 26 of the third float cap 19 may be threaded for connection with the first outer surface 13 of the top portion 10a of the first float cap 10, although other types of connections are contemplated as part of the present disclosure. For example, the third outer surface 27 of the third float cap 19 may be threaded for connection with the first inner surface 12 of the first float cap 10, while retaining the same amount of lateral clearance for the second radially extending float region 23, as in a previous embodiment illustrated in FIG. 1A.

When the temporary fastener is compressing material between the shoulder 8 of the first float cap and the at least one collet tip 9, the mandrel 5, at least one collet tip 9, at least one collet prong 6, the collet 2, and/or the material 7 may be subjected to significant lateral loading. The first radially extending float region 22 and second radially extending float region 23 allow the collet 2 and the mandrel 5 to translate radially (e.g., perpendicular to the longitudinal axis of the collet 2) within the float regions when subjected to lateral loading. The first radially extending float region 22 provides lateral clearance between the collet 2 and the first aperture walls 36 of the first aperture 11. The second radially extending float region 23 comprises the lateral clearance between the second outer surface 18 of the second float cap 14 and the first inner surface 12 of the first float cap 10. In another embodiment, the second radially extending float region 23 comprises the lateral clearance between the second outer surface 18 of the second float cap 14 and the third inner surface 26 of the third float cap 19.

As illustrated in FIG. 1A, the collet 2 and the temporary fastener body 4 may be connected, either by threads or other connection type. By providing the first radially extending float region 22, the second radially extending float region 23, and the third aperture diameter 25, the collet 2 and the temporary fastener body 4 can radially translate (e.g., translate laterally in a direction that is perpendicular to the longitudinal axis of the collet 2). In this embodiment, radial translation is possible until the collet 2 contacts the first aperture walls 36 of the first aperture 11 of the bottom portion 10b of the first float cap 10, until the second outer surface 18 of the second float cap 14 contacts the first inner surface 12 of the first float cap 10, and/or until the temporary fastener body 4 contacts the third aperture walls 32 of the third aperture 24.

For example, if the clearance between the collet 2 and the first aperture walls 36 of the first aperture 11 (e.g., the first radially extending float region 22) was 0.125 inches, the clearance between the second outer surface 18 of the second float cap 14 and the first inner surface 12 of the first float cap 10 (e.g., the second radially extending float region 23) was 0.125 inches, and the clearance between the temporary fastener body 4 and the third aperture walls 32 of the third aperture 24 was 0.140 inches, the collet 2 and temporary fastener body 4 would be allowed to radially translate 0.125 inches, in any direction, until the collet 2 contacted the first aperture walls 36 of the first aperture 11 of the first float cap 10 and the second outer surface 18 of the second float cap 14 contacted the first inner surface 12 of the first float cap 10. In some embodiments, the smallest of the three radial clearances described above defines the maximum amount of radial translation permitted between the collet 2 and the first float cap 10. In another embodiment, as illustrated in FIGS. 8-11 and described below, the range of radial translation is selectably restricted to one direction due to an alternate cross-section of the first inner surface 12 of the first float cap 10.

FIGS. 8-11 illustrate an additional embodiment of a first float cap 10'. In this embodiment, the first inner surface 12' of the first float cap 10' has a generally oval cross-section. A purpose of the generally oval cross-section for the first inner surface 12' of the first float cap 10' is, among other purposes, to restrict the radial translation of the collet 2 and the temporary fastener body 4 to a single direction, as is desired.

FIGS. 8-11 illustrate an additional embodiment of the first float cap 10. In this embodiment, a top portion 10a' of the first float cap 10' comprises a first inner surface 12' of generally oval or other non-circular cross-section. The first inner surface 12' of the first float cap 10' can include flat portions 34, as is illustrated in FIG. 9 and FIG. 11. The first float cap 10' comprises the top portion 10a' and a bottom portion 10b'. The bottom portion 10b' of the first float cap 10' can include the first aperture walls 36' of the first aperture 11' and a bottom external surface 13a', as illustrated in FIG. 11. The top portion 10a' can have an outer diameter greater than the outer diameter of the bottom portion 10b'. In this embodiment, the first float cap 10' comprises at least one shoulder 8'. The shoulder 8' can be positioned on the bottom portion 10b' at a transition between the top portion 10a' and the bottom portion 10b' of the first float cap 10'.

The first float cap 10' comprises a first aperture 11' of first aperture diameter 29' through at least a part of the length of the bottom portion 10b' of the first float cap 10', although the temporary fastener 1 can be made using a variety of different first aperture diameters as is needed to accommodate the selected collet 2 size. The first aperture 11' allows the collet 2 and the mandrel 5 to extend through the first float cap 10' and the second float cap 14 and connect to the temporary fastener body 4. The lateral distance between the collet 2 and the first aperture walls 36' of the first aperture 11' defines a first radially extending float region 22'. The first float cap 10' can include a first float cap inner diameter 21' in the top portion 10a' of the first float cap 10', which lies along the minor axis 33 of the cross-section of the first inner surface 12' of the first float cap 10'. The first float cap 10' can also include a major diameter 35 along the major axis 30 of the cross-section of the first inner surface 12' of the first float cap 10', as discussed below.

FIG. 9 illustrates a perspective view of this embodiment of the first float cap 10'. The first outer surface 13' may be threaded for connection with a third float cap 19, although other types of connections are contemplated as part of the present disclosure.

The cross-section of the first inner surface 12' of the first float cap 10' restricts radial translation of the second float cap 14 and the temporary fastener body 4. The second float cap 14 includes a second outer surface 18 which can be circular in cross-section. The flat portions 34 of the cross-section of the first inner surface 12' of the first float cap 10' reduce the lateral clearance available in the second radially extending float region 23' to the direction of a major axis 30 of the cross-section. The second radially extending float region 23' can be defined by the radial space between the outer surface 18 of the second float cap 14 and first inner surface 12' of the first float cap 10'. In this embodiment, the cross-section of the inner surface 12' of the first float cap 10' allows the second float cap 14 to radially translate (e.g., translate laterally in a direction perpendicular to the longitudinal axis of the collet 2) along a major diameter 35 of the cross-section of the first inner surface 12' of the first float cap 10'. The collet 2, the second float cap 14, and the temporary fastener body 4 are all axially connected, such that these components may radially translate together. In this embodiment, the collet 2, the second float cap 14, and the temporary fastener body 4 may radially translate only along the major diameter 35 of the cross-section of the first inner surface 12' of the first float cap 10'. All other directions of radial translation are restricted, because the second float cap 14, which can be of circular cross-section, has clearance to translate solely along the major diameter 35 of the cross-section of the first inner surface 12' of the first float cap 10'.

In this embodiment, the flat portions 34 of the cross-section of the first inner surface 12' of the first float cap 10' define a travel distance 37 which prohibits the second outer surface 18 of the second float cap 14 from radially translating along the minor axis 33 of the cross-section of the first inner surface 12' of the first float cap 10' and/or any radial translation direction that is not along the major diameter 35 of the cross-section of the first inner surface 12' of the first float cap 10'. The travel distance 37 is the length of the flat portion on either side of the cross-section of the first inner surface 12' of the first float cap 10'. The travel distance 37 extends parallel to the major axis 30 of the cross-section of the inner surface 12' of the first float cap 10', and allows the second outer surface 18 of the second float cap 14 to translate along its length. In this embodiment, once the second outer surface 18 of the second float cap 14 has reached either end of the travel distance 37 of the flat portion 34, the second outer surface 18 of the second float cap can be in contact with the first inner surface 12' of the first float cap 10', such that further radial translation of the second outer surface 18 of the second float cap 14 is prohibited.

In some embodiments, the diameter 38 of the collet 2 is at least 50.0% of the first aperture diameter 29' of the first aperture 11' of the first float cap 10'. Additionally, in other embodiments, the diameter 38 of the collet 2 is at least 60.0% of the first aperture diameter 29' of the first aperture 11' of the first float cap 10'. In some embodiments, the diameter 38 of the collet 2 is at least 70.0% of the first aperture diameter 29' of the first aperture 11' of the first float cap 10'. Further, in other embodiments, the diameter 38 of the collet 2 is approximately 66.0% of the first aperture diameter 29' of the first aperture 11' of the first float cap 10'.

In some embodiments, the first aperture diameter 29' of the first aperture 11' of the first float cap 10' is at least 30.0% of the first float cap inner diameter 21'. In other embodiments, the first aperture diameter 29' of the first aperture 11' of the first float cap 10' is at least 40.0% of the first float cap inner diameter 21'. In some embodiments, the first aperture diameter 29' of the first aperture 11' of the first float cap 10' is at least 50.0% of the first float cap inner diameter 21'. Further, in other embodiments, the first aperture diameter 29' of the first aperture 11' of the first float cap 10' is approximately 37.4% of the first float cap inner diameter 21'.

In some embodiments, the second float cap outer diameter 20' is at least 60.0% of the major diameter 35 of the cross-section of the first inner surface 12' of the first float cap 10'. In other embodiments, the second float cap outer diameter 20' is at least 70.0% of the major diameter 35 of the cross-section of the first inner surface 12' of the first float cap 10'. Further, in additional embodiments, the second float cap outer diameter 20' is at least 80.0% of the major diameter 35 of the cross-section of the first inner surface 12' of the first float cap 10'. In some embodiments, the second float cap outer diameter 20' is approximately 86.7% of the major diameter 35 of the cross-section of the first inner surface 12' of the first float cap 10'.

In some embodiments, the first aperture diameter 29' of the first aperture 11' is equal to the collet diameter 38 plus the travel distance 37 of the first inner surface 12' of the first float cap 10' plus an additional radial clearance of 0.002". However, it should be noted that the present disclosure contemplates varying means of calculating the first aperture diameter 29' of the first aperture 11' of the first float cap 10', and that the formula described above is not the sole calculation capable of calculating the first aperture diameter 29'. In one embodiment, the travel distance 37 can be 0.125" inches, although alternate travel distances are also contemplated as part of the present disclosure.

FIGS. 10-11 illustrate the first float cap 10' of FIGS. 8-9 in addition to a directional indicator 28. In one embodiment, the first float cap 10' comprises an indicator 28 which is attached to or a part of the shoulder 8' of the first float cap 10'. The indicator 28 allows a user of the temporary fastener 1 to determine which direction of radial translation of the collet 2 and the temporary fastener body 4 is unrestricted, while simultaneously allowing the user to ensure that radial translation in all other directions is restricted. The indicator 28 corresponds to the direction of the major axis 30 and the major diameter 35 of the cross-section of the first inner surface 12' of the first float cap 10'. Through use of the indicator 28, a user can install a plurality of these temporary fasteners during construction while simultaneously ensuring that radial translation of the collet 2 and the temporary fastener body 4 is restricted in all but the direction of the indicator 28.

In one embodiment, the shoulder 8' can be approximately 0.10" inches thick, while the indicator 28 can be approximately 0.125" inches tall (e.g. extending toward the bottom portion 10b' of the first float cap 10') and approximately 0.0781" inches wide. Additionally, this particular embodiment contemplates that the first outer surface 13 can define a circular cross-section with a diameter of approximately 1.123", and can have a top portion 10a' that is approximately 0.460" tall and a bottom portion 10b' that is approximately 0.750" inches tall. The bottom external surface 13a' can define a cross-section with a diameter of approximately 1.250" inches, and the first float cap 10' in this embodiment contemplates a first aperture diameter 29' of 0.374" with an additional 0.002" of radial clearance. Although approximate dimensions are provided for an embodiment of the present disclosure, the disclosure is by no means limited to those dimensions. Various dimensions for each of the aforementioned components are contemplated as part of the present disclosure, because the dimensions for each of the aforementioned components differs based on the application of the temporary fastener. Some temporary fasteners may need larger dimensions to accommodate certain applications, while other temporary fasteners may need smaller dimensions to accommodate other applications.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include these features, elements and/or states.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

While the above detailed description may have shown, described, and pointed out novel features as applied to various embodiments, it may be understood that various omissions, substitutions, and/or changes in the form and details of any particular embodiment may be made without departing from the spirit of the disclosure. As may be recognized, certain embodiments may be embodied within a form that does not provide all of the features and benefits set forth herein, as some features may be used or practiced separately from others.

Additionally, features described in connection with one embodiment can be incorporated into another of the disclosed embodiments, even if not expressly discussed herein, and embodiments having the combination of features still fall within the scope of the disclosure. For example, features described above in connection with one embodiment can be used with a different embodiment described herein and the combination still fall within the scope of the disclosure.

It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this disclosure may comprise, additional to its essential features described herein, one or more features as described herein from each other embodiment disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added.

Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Reference to any prior art in this description is not, and should not be taken as, an acknowledgement or any form of suggestion that that prior art forms part of the common general knowledge in the field of endeavor in any country in the world.

The invention may also be said broadly to consist in the parts, elements and features referred to or indicated in the description of the application, individually or collectively, in any or all combinations of two or more of said parts, elements or features.

Where, in the foregoing description, reference has been made to integers or components having known equivalents thereof, those integers are herein incorporated as if individually set forth. In addition, where the term "substantially" or any of its variants have been used as a word of approximation adjacent to a numerical value or range, it is intended to provide sufficient flexibility in the adjacent numerical value or range that encompasses standard manufacturing tolerances and/or rounding to the next significant figure, whichever is greater.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It is therefore intended that such changes and modifications be included within the scope of the invention. Moreover, not all of the features, aspects and advantages are necessarily required to practice the present disclosure. Accordingly, the scope of the present invention is intended to be defined only by the claims.

What is claimed is:

1. A temporary fastener device, the device comprising:
   a first float cap;
   a third float cap connected to the first float cap;
   a collet at least partially disposed within the first float cap and configured to connect to a temporary fastener body, the collet further comprising;
      at least one collet prong;
      at least one collet tip that is configured to secure material between the at least one collet tip and first float cap; and
      a mandrel at least partially disposed within the collet;
   a second float cap disposed between the first float cap and the third float cap, wherein said second float cap is configured to connect to the temporary fastener body, wherein the second float cap and the temporary fastener body are connected with a threaded connection; and
   wherein the collet and the second float cap are configured to move laterally with respect to the first float cap within a first radially extending float region and a second radially extending float region.

2. The temporary fastener device of claim 1, wherein the first radially extending float region has greater lateral clearance than the second radially extending float region.

3. The temporary fastener device of claim 1, wherein the first radially extending float region and the second radially extending float region have equal lateral clearance.

4. The temporary fastener device of claim 1, wherein the first radially extending float region has less lateral clearance than the second radially extending float region.

5. The temporary fastener device of claim 1, wherein the first float cap and third float cap are connected with a threaded connection.

6. The temporary fastener device of claim 1, wherein a third outer surface of the third float cap mechanically communicates with a first inner surface of the first float cap.

7. A temporary fastener device, the device comprising:
   a first float cap comprising;
      a first inner surface having a non-circular cross-section, the first inner surface comprising;
      at least one flat portion;
      a major diameter; and
      a minor diameter;
   a collet at least partially disposed within the first float cap, in mechanical communication with a temporary fastener body, the collet further comprising;
      at least one collet prong;
      at least one collet tip that is configured to secure material between the at least one collet tip and first float cap; and
      a mandrel at least partially disposed within the collet, in mechanical communication with a temporary fastener body;
   a third float cap connected to the first float cap; and
   a second float cap disposed between the first float cap and the third float cap, wherein said second float cap is in mechanical communication with the temporary fastener body; and
   wherein the mandrel, the collet, and the second float cap are configured to move laterally with respect to the first float cap within a first radially extending float region between the collet and the first float cap and a second radially extending float region between the second float cap and the first inner surface of the first float cap.

8. The temporary fastener device of claim 7, wherein the first float cap further comprises an indicator configured to confirm alignment of the cross-section of the inner surface of the first float cap.

9. The temporary fastener device of claim 8, wherein the indicator is located along a shoulder of said first float cap.

10. The temporary fastener device of claim 7, wherein the first radially extending float region has greater lateral clearance than the second radially extending float region.

11. The temporary fastener device of claim 7, wherein the first radially extending float region and the second radially extending float region have equal lateral clearance.

12. The temporary fastener device of claim 7, wherein the first radially extending float region has less lateral clearance than the second radially extending float region.

13. The temporary fastener device of claim 7, wherein the first float cap and third float cap are connected with a threaded connection.

14. The temporary fastener device of claim 7, wherein the second float cap and temporary fastener body are connected with a threaded connection.

15. The temporary fastener device of claim 7, wherein a third outer surface of the third float cap mechanically communicates with a first inner surface of the first float cap.

* * * * *